(12) United States Patent
Forster

(10) Patent No.: US 9,514,286 B2
(45) Date of Patent: Dec. 6, 2016

(54) CONTEXT-BASED SECURITY POLICY EVALUATION USING WEIGHTED SEARCH TREES

(75) Inventor: Craig Robert William Forster, Southport (AU)

(73) Assignee: International Business Machines Corporation, Armonk, NY (US)

( * ) Notice: Subject to any disclaimer, the term of this patent is extended or adjusted under 35 U.S.C. 154(b) by 1465 days.

(21) Appl. No.: 12/749,665

(22) Filed: Mar. 30, 2010

(65) Prior Publication Data

US 2011/0246498 A1 Oct. 6, 2011

(51) Int. Cl.
*G06F 7/00* (2006.01)
*G06F 21/10* (2013.01)

(52) U.S. Cl.
CPC ................... *G06F 21/10* (2013.01)

(58) Field of Classification Search
None
See application file for complete search history.

(56) References Cited

U.S. PATENT DOCUMENTS

| | | | |
|---|---|---|---|
| 7,197,764 B2 | 3/2007 | Cichowlas | |
| 7,451,477 B2 | 11/2008 | Griffin et al. | |
| 7,509,677 B2 | 3/2009 | Saurabh et al. | |
| 7,512,976 B2 | 3/2009 | Burrows | |
| 7,523,200 B2 | 4/2009 | Gross et al. | |
| 7,921,452 B2* | 4/2011 | Ridlon et al. | ............. 726/1 |
| 2003/0105978 A1* | 6/2003 | Byrne | ............. G06F 17/30067 |
| | | | 726/4 |
| 2005/0081063 A1* | 4/2005 | Patrick | ............. G06F 21/6218 |
| | | | 726/4 |
| 2005/0108229 A1* | 5/2005 | Betts et al. | ............. 707/7 |
| 2005/0166260 A1* | 7/2005 | Betts et al. | ............. 726/4 |
| 2006/0059155 A1* | 3/2006 | Illg et al. | ............. 707/9 |
| 2006/0225055 A1 | 10/2006 | Tieu | |
| 2007/0056018 A1 | 3/2007 | Ridlon et al. | |
| 2007/0106748 A1* | 5/2007 | Jakobsson et al. | ............. 709/217 |
| 2007/0143851 A1* | 6/2007 | Nicodemus | ............. G06F 21/55 |
| | | | 726/25 |
| 2007/0150934 A1 | 6/2007 | Fiszman et al. | |
| 2007/0150936 A1* | 6/2007 | Maes | ............. H04L 67/10 |
| | | | 726/1 |
| 2007/0156659 A1 | 7/2007 | Lim | |

(Continued)

OTHER PUBLICATIONS

Liu et al., "XEngine: A Fast and Scalable XACML Policy Evaluation Engine," SIGMETRICS '08, Jun. 2008.

*Primary Examiner* — Fred I Ehichioya
*Assistant Examiner* — Hasanul Mobin
(74) *Attorney, Agent, or Firm* — Jeffrey S. LaBaw; David H. Judson

(57) ABSTRACT

A method, apparatus and computer program product for evaluating a context-based (e.g., XACML) policy having a set of attributes using a weighted index tree having one or more leaves extending from a root node. Each leaf of the tree represents a policy rule. A depth-first path down the leaf represents one or more attributes of the set of attributes that must be present in a request for the rule to be applicable. An input is evaluated against the weighted index tree to generate a response. One type of input is an authorization request, in which case the response is an authorization decision (e.g., permit or deny). Another type of input is a query for a set of entitlements, in which case the response is a set of entitlements.

27 Claims, 6 Drawing Sheets

(56) References Cited

U.S. PATENT DOCUMENTS

| | | |
|---|---|---|
| 2007/0156727 A1 | 7/2007 | Lim |
| 2007/0157288 A1 | 7/2007 | Lim |
| 2007/0220023 A1* | 9/2007 | Dean et al. .................. 707/101 |
| 2007/0266009 A1 | 11/2007 | Williams |
| 2008/0016580 A1 | 1/2008 | Dixit et al. |
| 2008/0066160 A1* | 3/2008 | Becker .................... G06F 21/62 726/4 |
| 2008/0184336 A1* | 7/2008 | Sarukkai ............. G06F 21/6218 726/1 |
| 2009/0024618 A1* | 1/2009 | Fan ................... G06F 17/30327 |
| 2009/0089789 A1* | 4/2009 | Faltings et al. ............... 718/104 |
| 2009/0106815 A1 | 4/2009 | Brodie et al. |
| 2009/0288135 A1* | 11/2009 | Chang et al. ..................... 726/1 |
| 2009/0288136 A1* | 11/2009 | Chang et al. ..................... 726/1 |
| 2009/0307742 A1 | 12/2009 | Forster |
| 2010/0250560 A1* | 9/2010 | Shinjo et al. ................. 707/753 |
| 2010/0306818 A1* | 12/2010 | Li et al. ........................... 726/1 |

\* cited by examiner

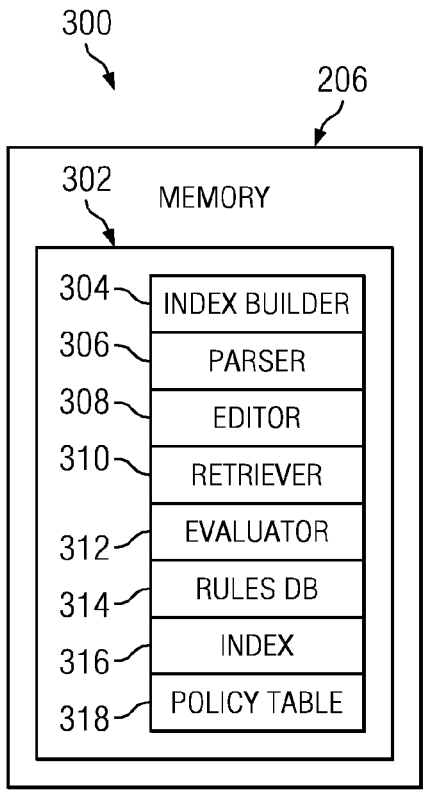
FIG. 3
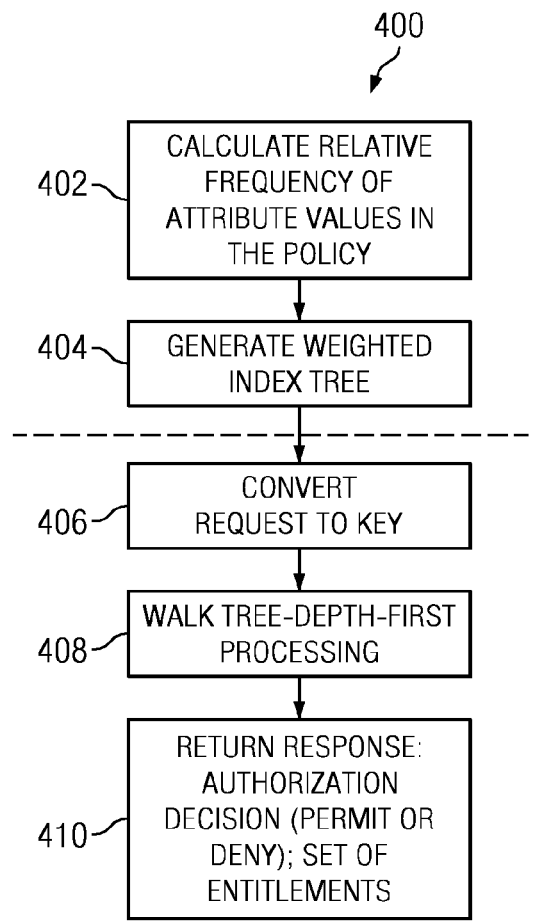
FIG. 4
| RULE ID | SUBJECT-ID | RESOURCE-ID | ACTION-ID |
|---|---|---|---|
| r0001 | Craig | Resource-1 | View |
| r0002 | Craig | Resource-1 | Edit |
| r0003 | Kerry | Resource-2 | View |
| r0004 | Fionna | Resource-3 | View |
FIG. 5

600

| VALUE | FREQUENCY |
|---|---|
| *Subject-id* = Craig | 2 |
| *Subject-id* = Kerry | 1 |
| *Subject-id* = Fiona | 1 |
| *Resource-id* = Resource-1 | 2 |
| *Resource-id* = Resource-2 | 1 |
| *Resource-id* = Resource-3 | 1 |
| *Action-id* = View | 3 |
| *Action-id* = Edit | 1 |

| RULE ID | KEY |
|---|---|
| r0001 | [0, 1, 2] |
| r0002 | [1, 2, 3] |
| r0003 | [0, 5, 7] |
| r0004 | [0, 4, 6] |

| VALUE | FREQUENCY | IDENTIFIER |
|---|---|---|
| *Action-id* = View | 3 | 0 |
| *Resource-id* = Resource-1 | 2 | 1 |
| *Subject-id* = Craig | 2 | 2 |
| *Action-id* = Edit | 1 | 3 |
| *Resource-id* = Resource-3 | 1 | 4 |
| *Resource-id* = Resource-2 | 1 | 5 |
| *Subject-id* = Fiona | 1 | 6 |
| *Subject-id* = Kerry | 1 | 7 |

*FIG. 7*

| RULE ID | SUBJECT-ID | RESOURCE-ID | ACTION-ID |
|---|---|---|---|
| r0001 | Craig | Resource-1 | View |
| r0002 | Craig | Resource-1 | Edit |
| r0003 | Kerry | Resource-2 | View |
| r0004 | Fionna | Resource-3 | View |
| r005 | Craig | Resource-3 | * |

| RuleId | CONTAINING POLICY IDENTIFIERS |
|---|---|
| Rule1 | Root, policy1 |
| Rule2 | Root, policy1 |
| Rule3 | Root, policy2 |
| Rule4 | Root, policy2 |

FIG. 11

FREQUENCY: 1100

| VALUE | FREQUENCY |
|---|---|
| *Subject-id* = Craig | 3 |
| *Subject-id* = Kerry | 1 |
| *Subject-id* = Fiona | 1 |
| *Resource-id* = Resource-1 | 2 |
| *Resource-id* = Resource-2 | 1 |
| *Resource-id* = Resource-3 | 2 |
| *Action-id* = View | 3 |
| *Action-id* = Edit | 1 |

FIG. 13

RULE KEYS: 1300

| RULE ID | KEY |
|---|---|
| r0001 | [0, 1, 3] |
| r0002 | [1, 3, 4] |
| r0003 | [0, 5, 7] |
| r0004 | [0, 2, 6] |
| r005 | [1, 2] |

FIG. 12

ORDERED MAPPINGS: 1200

| VALUE | FREQUENCY | IDENTIFIER |
|---|---|---|
| *Action-id* = View | 3 | 0 |
| *Subject-id* = Craig | 3 | 1 |
| *Resource-id* = Resource-3 | 2 | 2 |
| *Resource-id* = Resource-1 | 2 | 3 |
| *Action-id* = Edit | 1 | 4 |
| *Resource-id* = Resource-2 | 1 | 5 |
| *Subject-id* = Fiona | 1 | 6 |
| *Subject-id* = Kerry | 1 | 7 |

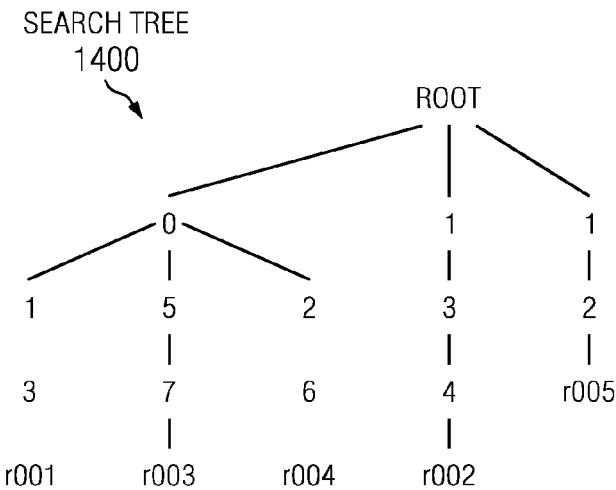

FIG. 14

```
<PolicySet Id="root" CombiningAlgorithm="deny-overrides">
    <Policy Id-"policy1" CombinginAlgorithm-"permit-overides">
        <Rule Id="rule1" Effect="Permit>
            <!-- Insert rule logic here -->
        </Rule>
        <Rule Id="rule2" Effect="Deny">
            <!-- Insert rule logic here -->
        </Rule>
    </Policy>
    <Policy Id="policy2" CombiningAlgorithm="first-applicable">
        <Rule Id="rule3 Effect="Permit>
            <!-- Insert rule logic here -->
        </Rule>
        <Rule Id="rule3 Effect="Permit>
            <!-- Insert rule logic here -->
        </Rule>
    </Policy>
</PolicySet>
```

FIG. 15

| POLICY IDENTIFIER | CONTAINING ALGORITHM |
|---|---|
| Root | Deny-overrides |
| Policy1 | Permit-overrides |
| Policy2 | first-applicable |

FIG. 17

CONTEXT-BASED SECURITY POLICY EVALUATION USING WEIGHTED SEARCH TREES

CROSS-REFERENCE TO RELATED APPLICATION

This application is related to Ser. No. 12/133,850, filed Jun. 5, 2008, titled "Indexing of Security Policies."

BACKGROUND OF THE INVENTION

1. Technical Field

This disclosure relates generally to access control mechanisms in a distributed computing environment and, in particular, to computationally-efficient techniques for evaluating context-based policies for authorization and entitlements processing.

2. Background of the Related Art

The eXtensible Access Control Markup Language, or XACML, is an Organization for the Advancement of Structured Information Standards (OASIS)-managed industry standard for managing access control policy. The industry standard is available from the OASIS web site. XACML provides an XML-based context-based security language for specifying access control policies. When used for access control, existing open standard formats such as XACML are focused around returning a single access decision, such as "permit" or "deny." In contrast, "entitlements" involve the notion of returning a set of items for which access is allowed. Typically, entitlements are a set of control specifications (rendered through policies) that govern an identity's access to information, application and systems, where a user is one such identity. Support for entitlements is a common requirement to facilitate more efficient access control models.

In contextual security policy such as XACML, wherein an access control request is composed of a context containing attributes about the request itself and the relevant environment, entitlements often are provided by selecting from the policy a subset of these attributes to "index" and support. This approach, however, is limited in that only the attributes chosen to be indexed can be returned as a set of entitlements. For example, if resource-id (the unique identifier of a resource) is chosen to index, a request for entitlements regarding which subjects are allowed to access the resource would not return meaningful results.

It would be desirable to allow entitlements to be evaluated using a contextual security policy language such as XACML without requiring certain attributes to be indexed explicitly. It is also desired to provide computationally-efficient techniques for performing such evaluation.

BRIEF SUMMARY

A machine-implemented method for evaluating a context-based (e.g., XACML) policy having a set of attributes using a weighted index tree having one or more leaves extending from a root node. Each leaf of the tree represents a policy rule. A depth-first path down the leaf represents one or more attributes of the set of attributes that must be present in a request for the rule to be applicable. An input is evaluated against the weighted index tree to generate a response. One type of input is an authorization request, in which case the response is an authorization decision (e.g., permit or deny). Another type of input is a query for a set of entitlements, in which case the response is a set of entitlements.

In another embodiment, an apparatus for evaluating security policy comprises a processor, and computer memory holding computer instructions that, when executed by the processor, perform a method for evaluating a context-based policy, the policy having a set of attributes. The method begins by identifying (from the policy) a relative frequency of a set of attribute values. The set of attribute values are then sorted, and an identifier is assigned to each of the set of sorted attribute values. Preferably, the identifier is a numerical identifier (such as a unique integer). Using the assigned identifiers, a search tree is then generated. Each leaf of the search tree defines a rule, and a depth-first path down the leaf represents one or more attributes of the set of attributes that must be present in a request for the rule to be applicable. A request (such as an authorization decision request, an entitlements query, or the like) is then evaluated against the search tree. The structure of the search tree is such that the policy evaluation is computationally-efficient. Moreover, where the request is an entitlements query, the approach enables entitlements to be evaluated using the context-based security policy without requiring certain attributes to be explicitly indexed.

According to another aspect, a computer program product is provided for generating a weighted index tree for use in evaluating a context-based security policy. The computer program product holds computer program instructions which, when executed by a data processing system, perform a tree generation method. The method comprises the following steps: normalizing a policy, identifying a frequency of occurrence in the policy of a set of attribute values, sorting the set of attribute values, assigning a unique identifier to each of the sorted attribute values, using the unique identifiers to generate a normalized rule set, each rule in the normalized rule set having a key associated therewith, and constructed a weighted index tree using the keys.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 is a block diagram of high level components of a policy evaluation manager used to facilitate the techniques described herein;

FIG. 4 is a process flow diagram illustrating the generation of a weighted index tree and how that tree is used to evaluate a context-based security policy;

FIG. 5 is a table representing a policy table;

FIG. 6 is a table illustrating how to calculate occurrence frequencies for the policy attributes shown in the policy table of FIG. 5;

FIG. 7 is a table illustrating how to sort occurrence frequencies and how to assign numerical identifiers to the sorted policy attributes that have been derived from the policy table of FIG. 5;

FIG. 8 is a table illustrating how the assigned numerical identifiers in FIG. 7 are used to generate a set of keys;

FIG. 11 is a table of occurrence frequencies for the table of FIG. 10;

FIG. 12 is a table illustrating the ordered mapping of the sorted policy attributes and the associated numerical identifiers for the table of FIG. 11;

FIG. 13 is a table illustrating the set of rule keys for the ordered mapping of FIG. 12;

FIG. 14 is a weighted index tree corresponding to the set of rules and the associated keys defined in the table of FIG. 12;

FIG. 15 is a representative XACML policy;

FIG. 17 is a second data structure that is based on the XACML policy of FIG. 15 and that is stored in conjunction with a policy table to facilitate processing of requests that involve multiple rules.

DETAILED DESCRIPTION OF AN ILLUSTRATIVE EMBODIMENT

Figure 1:
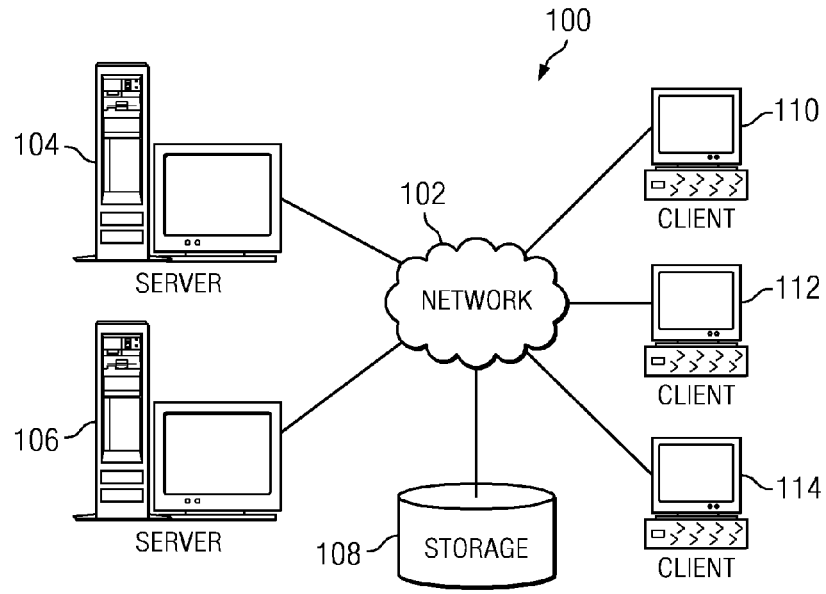
FIG. 1 depicts an exemplary block diagram of a distributed data processing environment in which exemplary aspects of the illustrative embodiments may be implemented.
Figure 2:
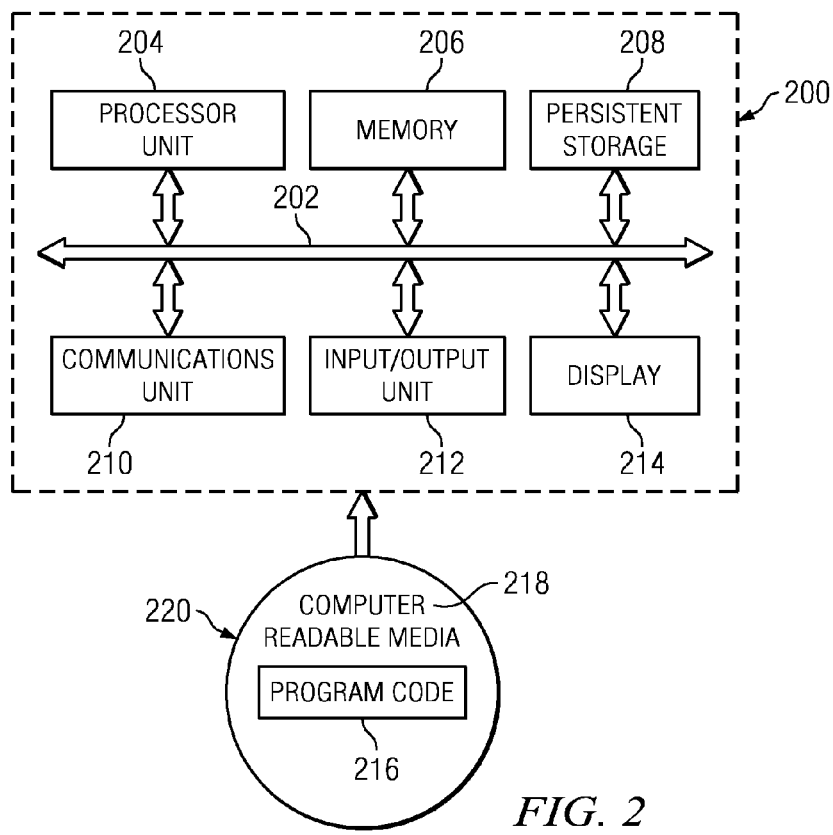
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The data processing system supports context-based security policy mechanisms that are known in the art. One such mechanism is eXtensible Access Control Markup Language, or XACML. Familiarity with XACML is presumed. An XACML policy consists of a policy set and a policy combining algorithm. A policy set is a sequence of policies or policy sets, and a target, and a policy is a target, a rule set, and a rule combining algorithm. A target specifies the type of requests to which the policy or policy are applied. Only if a request satisfies the target of a policy is the request then checked against the policy rule set. A rule set is a set of rules, and a rule has a target, an optional condition and an effect (e.g., permit or deny). The rule target specifies whether the rule is applicable to the request. If a request matches the target and any condition of a rule, the effect is returned as a decision. XACML provides for several rule or policy combining algorithms including, without limitation: first-applicable, only-one-applicable, deny-overrides, and permit-overrides. XACML access control works by evaluating an XACML request (containing an authenticated subject, the resource being accessed, and the action being performed) with one or more XACML-based access control policies, and returning an XACML response permitting or denying the requested access.

FIG. 3 illustrates the high level components of a known policy evaluation manager for use herein. This functionality is described in commonly-owned, co-pending application Ser. No. 12/133,850. Policy management configuration 300 is an example implementation of evaluation manager 302 within the context of data processing system 200 of FIG. 2. In particular, policy evaluation manager 302 is shown within memory 206 of data processing system 200 of FIG. 2. Policy evaluation manager 302 may also be located within other memory locations until needed for use as desired. Other memory locations include persistent storage 208 of FIG. 2. Policy evaluation manager 302 is comprised of a number of cooperating components to deliver effective evaluation of security policy related requests. The components typically comprise an index builder 304, a parser 306, an editor 308, a retriever 310, an evaluator 312, and a rules database (DB) 314. The components work in cooperation with one another, but also with other system-related components. Although shown as separate entities, the components may also be implemented as a collection of services within a common offering, or combined in other ways to achieve the same functional capability.

Index builder 304 provides a capability to produce keys based on values for rules for vocabulary elements. The key of the index is the combination of attribute values that must be contained in a request for the rule to be applicable. The key is therefore built from the attribute value combinations. The index key reduces the time required to determine an applicable policy element related to a request. A policy element is an attribute and value combination. For example, an attribute of "subject-id" and an associated value of "Craig" defines a policy element of "subject-id=Craig." A policy is then a set of policy elements that when evaluated with an associated condition may produce a single result. Parser 306 provides a parsing capability to analyze the requests, the rule information, and the policy vocabulary. The parser may be the same parser used to interpret the markup language used or may be specialized for additional tasks. Editor 308 has a capability of creating, modifying and deleting rules, as well as policy elements. Editor 308 may be a typical text editor or other edit-capable component adapted to work with the data format chosen for the policy elements and rules implementation. Retriever 310 fetches rules from a rules database or storage system as required for evaluation of a request. Retrieval may be for a list or set of candidate rules that are later evaluated. Rules may also be retrieved for subsequent processing by an editor. Evaluator 312 provides a capability to examine rules provided in turn to determine a result. As stated previously, the result must return a "true" for the rule to be applicable. Rules database (DB) 314 contains a set of rules. Rules are composed of a target portion and a condition portion. The target portion defines the subject or target of the rule. The condition portion defines criteria applicable to the target that must be met in combination with the subject for the rule to be true. For example, a rule for salary processing may have a target of "annual salary" and a condition portion of "less than 20,000." Index 316 is a set of related keys obtained through the build process of index builder 304. The keys of index 316 represent an ordered list of corresponding policy elements. Policy table 318 is a data structure comprising entries for the policy elements and rule identifiers. Each row in the data structure, when implemented as a table, contains a policy and a corresponding rule entry. The policy elements define the key.

Once XACML policy has been flattened, e.g., by the process described in Ser. No. 12/133,580, the result is a set of policy elements that are distinct. Preferably, each rule is only applicable to one request. This applicability is determined by a combination of functions, such as "string-equals" and "integer-greater-than." The only restriction on the functions is that they must take two parameters as arguments and return a Boolean value. The indexing process requires only equality functions are present in the target of the policy elements. This restriction ensures that an efficient set lookup can be performed rather than the sequential checking for matched values that is normally required by XACML. To achieve this, the non-equals matching functions are moved from the target section of the rule to the condition section, or portion, of the rule, combined with any existing condition using a boolean AND operator.

Thus, and according to the subject matter disclosed in Ser. No. 12/133,580, a method of indexing policy is provided such that a policy element applicable to a given request can be quickly and efficiently determined. In particular, the policy is reduced to a set of distinct rules, where each rule is applicable to only one request. An index is created for these distinct rules, where the key of the index is the combination of attribute values that must be present in the request for the rule to be applicable. To ensure efficient lookups from the index, all functions that do not involve equality checks are located in the condition portion of the rule. This indexing process typically allows large sets of security policy to be more efficiently evaluated. A request is received containing policy elements. The request is handled so that the policy elements are resolved through an index look-up to a rule for the set of policy elements. The rule is then evaluated for the policy elements. Illustrative embodiments typically reduce the complexity of and different forms of expressions that must be evaluated to determine an applicable rule. The indexing described provides a more efficient mechanism to determine applicability of a rule for a given policy.

With the above as background, the subject matter of the present disclosure can be described. This disclosure relates generally to a "weighted index tree" enhancement to the context-based security policy "flattening" technique (as described in Ser. No. 12/133,850) that facilitates entitlements processing even if certain policy attributes are not explicitly indexed. As will be seen, the techniques herein provide several advantages over the prior art. First, no particular attribute in the policy is elevated above the others in terms of indexing importance; thus, all attributes in the policy can be queried for entitlements. Second, the weighted index tree ensures that each step of the policy evaluation (whether for an authorization decision or in response to an entitlements query) is as computationally-efficient as possible. In particular, only portions of the weighted index tree relevant to a given request are visited, and each decision down the tree eliminates a greatest number of irrelevant results as possible. Using this approach, entitlements queries on policy in the XACML v2.0 standard are realized.

FIG. 4 is a process flow diagram illustrating the generation of a weighted index tree and how that tree is used to evaluate a context-based security policy according to the techniques described herein. Prior to the process flow shown, the security policy has been indexed (flattened) into a set of distinct rules, with each rule containing the set of attribute values that must be present in a context for the rule to be evaluated. This is the technique described above in Ser. No. 12/133,580. At step 402, and according to this disclosure, the relative frequency of each of these attribute values is calculated across all (or substantially all) of the flattened policy. For example, the requirement for the "subject-id" to be "Craig" might be present ten (10) times in the policy, and the requirement for the "subject-id" to be "Fiona" might be only five (5) times. Once calculated, the attribute values are ordered according to their frequency and, at step 404, a weighted index tree is built, with more frequently used attributes higher than the least frequently used attributes. As will be seen, the nodes in this decision tree are determined by a combination of attribute values required for the rules to be applicable. This tree is built iteratively, adding the nodes for each rule in turn. Thus, for example, Rule 1 might require the values subject-id=Craig, resource-id=Resource-1 and action-id=read, whereas Rule 2 might require subject-id=Craig, resource-id=Resource-2 and action-id=read. In this example, subject-id=Craig and action-id=read are the most frequently used attributes, so these are placed higher in the tree than Resource-1 and Resource-2. Assuming "Craig" is placed before "read," using this approach a simplified decision tree for these two rules might then look like the following:

subject-id=Craig→action-id=read→resource-
id=Resource-1→resource-id=Resource-2

Returning to FIG. 4, the weighted index tree is then used in several possible ways, e.g., to respond to an authorization decision request, to respond to an entitlements query, and so forth. To this end, a given request (e.g., for an authorization decision, an entitlements query, etc.) is converted into a key. This is step 406. At step 408, the key is used to walk the tree. As will be seen, walking the decision tree refers to searching the tree in a depth-first manner. For an authorization decision, the tree is searched depth-first, only visiting a child node if the appropriate node is in the input request context (as determined by the values in the key). Once a leaf in the tree is reached (through step 408), the appropriate rule is returned and evaluated. This is step 410 in a first embodiment (evaluating the security policy for an authorization decision). In a second embodiment, the security policy is evaluated with respect to an entitlements query. For such a query, the request input is both a request context and one or more attribute types (e.g., "resource-id") that are to be gathered in response to the query. In this embodiment, step 408 involves exhaustively searching the tree, once again in a depth-first manner, visiting child nodes if they are either in the input request or if they are of the attribute types being gathered. The gathered attributed types are saved until a leaf node is reached. Upon reaching the leaf node, the rule that must be evaluated and the attribute values that are entitled to that rule are known, and the response is returned (step 410).

Together, the steps 402 and 404 comprise a tree generation function 400. This function may be performed off-line, e.g., when the security policy is loaded into a policy manager, or it may carried out dynamically (or "on-the-fly"), e.g., in response to receipt of the authorization request, the entitlements query, or other request input. In addition, and although not shown in detail, one of ordinary skill in the art will appreciate that the "policy" typically comprises multiple policy sets that are aggregated together before the policy is indexed (flattened) and then processed to generate the weighted index tree. Thus, a given weighted index tree typically includes data from multiple policy sets, although this is not a limitation. In a preferred embodiment, a given policy is compliant with the XACML specification, although the techniques described herein also are not limited to XACML-based security policies. Rather, the techniques shown in FIG. 4 are applicable to any context-based security policy implementation.

The following section describes several examples of the techniques shown in FIG. 4 wherein a policy is normalized and then indexed into a tree structure. As is well-known, an XACML-based policy has a vocabulary, namely, a set of AttributeDesignators and AttributeSelector elements, to determine which part of an input Request is necessary. Each of these attribute sources has a set of concrete values in the policy. To index the policy, and as noted above, the disclosed technique first calculates a relative frequency of each concrete attribute value, preferably assigning it a rank between 0→n. This allows the relevant input values to be represented by integers (which speeds-up execution, as comparing integers is more computationally-efficient than comparing string values) and to determine which attributes to examine to obtain the most value of each point, allowing the building of a comparison tree of the most-efficient form. As a concrete example, FIG. 5 illustrates a table 500 showing a normalized policy. This is the policy table 318 referenced in FIG. 3. Given this policy table, FIG. 6 is a table 600 illustrating how to calculate occurrence frequencies for the policy attribute values shown in the policy table of FIG. 5. As can be seen, attribute value "action-id=View" has the highest frequency (3 occurrences), followed by the attributed values "subject-id=Craig" and "resource-id=Resource-1" each with the next highest frequency (2 occurrences). Once these frequencies are calculated (this is step 402 in FIG. 4), they are sorted by frequency and assigned a numerical identifier. The result is the table 700 shown in FIG. 7. In particular, table 700 illustrates how to sort occurrence frequencies and how to assign numerical identifiers to the sorted policy attributes that have been derived from the policy table of FIG. 5. Continuing with the above example, the action-id=View attribute value (the one with the highest frequency occurrence in the policy) is assigned the lowest value identifier ("0"), followed by the next frequent attribute values (assigned identifiers "1" and "2"), and so forth. Each attribute value entry in the table 700 is assigned a unique numerical identifier (a unique integer). Using the assigned identifiers, the weighted index tree can then be built.

In particular, each rule in the normalized rule set (from table 500 in FIG. 5) is assigned a set of numerical identifiers as its key. Thus, rule 1 (r0001) (in table 500) with subject-id Craig, resource-id Resource-1 and action-id View is assigned key [0, 1, 2], rule 2 with subject-id Craig, resource-id Resource-1 and action-id Edit is assigned key [1, 2, 3], and so forth. FIG. 8 illustrates a table 800 illustrating how the assigned numerical identifiers in FIG. 7 are used to generate a set of keys.

Then, using the set of rules and the associated keys defined in the table 800, a weighted index tree 900 is then constructed. As can be seen, a depth-first search leads to each of the nodes in the key in turn. In particular, each of the leaf nodes, such as leaf node 902, represents a rule in the policy (or policy set), and a depth-first path down the tree represents the attributes that must be present in a request for that rule to be applicable. By using the ordered values in the keys (which preferably go from smallest to largest integers), each leaf of the tree is "ordered" such that, as a leaf is traversed downward starting from the root node, the sequence of integer values increases. This enables computational efficiencies to be achieved when the tree is searched against a given in-bound request.

Although not meant to be limiting, in a particular implementation, each node in the weighted index tree may be an object written in Java, with each object having knowledge of one or more child objects.

The weighted index is then used to evaluate the policy against an in-bound request, an entitlements query, or other in-bound request.

In a first embodiment, an authorization decision request is evaluated as follows. The request is first converted to a series of numerical identifiers (as with the rules themselves), and then a depth-first search of the tree is performed. For example, assume a request for an authorization decision is: subject-id=Craig, resource-id=Resource-1 and action-id=View. This request is converted to the numerical key [0, 1, 2] using the example above. The tree is then walked, ensuring at each node that the current numerical identifier is in the request. If not, there is no need to proceed further down the tree. From the search tree shown in FIG. 9, it can be seen that the only leaf node reached is "r001" meaning that this is the only rule that is applicable to the request. That rule is then evaluated and an authorization response (e.g., "permit" or "deny") is then returned in the usual manner. In another example, assume that the request includes an attribute that is not in the policy. In such case, a numerical identifier for the attribute is not added in the request key. Thus, if the request is subject-id=Vern, resource-id=Resource-1 and action-id=View, the new request key is [0, 1], as "Vern" is not present in the policy.

Figures 9, 10, 16:
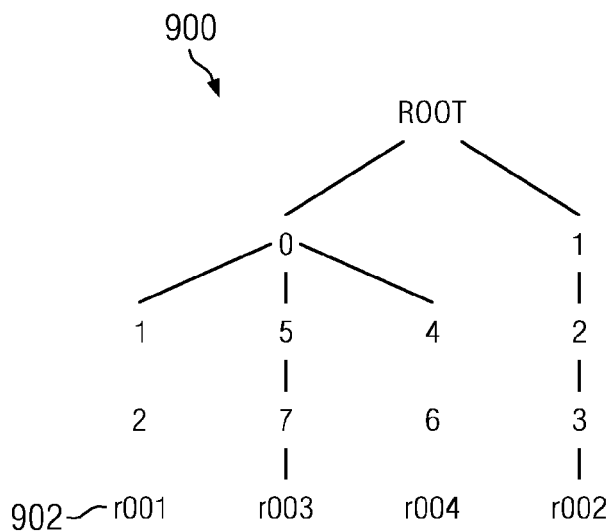
FIG. 9 is a weighted index tree corresponding to the set of rules and the associated keys defined in the table of FIG. 8.
FIG. 10 is another policy table that includes a rule having a wildcard attribute.
FIG. 16 is a first data structure that is based on the XACML policy of FIG. 15 and that is stored in conjunction with a policy table to facilitate processing of requests that involve multiple rules.

The processing is similar for an entitlements query. An "entitlements" query typically refers to queries of the form: "return a list of resource-id that Craig can View" or "return a list of action-id that Kerry can perform on Resource-2". The weighted index tree (such as shown in FIG. 9) is then used to calculate which concrete values should be returned given an input "partial Request" and an input "attribute source." Continuing with the above example, the inputs for the first query (what can Craig View) are:
  Partial Request:
    Subject-id=Craig
    Action-id=View
  Attribute Source:
    Resource-id To evaluate this entitlements query, the tree is walked before using the partial request as appropriate. However, when a tree node is hit that contains a concrete value for the attribute source, that value is added to a set and tracked for later use. The rule identifiers that are hit are also tracked. Given the tree in FIG. 9, the input partial request is [0, 2], and the potential matches are [1, 4, 5]. Walking the tree with [0, 2] ends up with a gathered result of [1] and the rule "r001". Thus, in response to this particular entitlements query, the evaluation returns "Resource-1" provided r001 evaluates to "Permit."

The following paragraph describes an alternative example wherein another rule to the rule set. In this example, the rule includes an attribute value defined by a wildcard. FIG. 10 illustrates the policy table 1000 that includes a rule 1002 having a wildcard attribute. In this example, the wildcard "*" means there is no restriction on action-id for this rule to be applicable. In other words, Craig can perform any action on Resource-3. FIG. 11 is a table 1100 of occurrence frequencies for the table of FIG. 10, and FIG. 12 is a table 1200 illustrating the ordered mapping of the sorted policy attributes and the associated numerical identifiers for the table of FIG. 11. FIG. 13 is a table 1300 illustrating the set of rule keys for the ordered mapping of FIG. 12. FIG. 14 is a weighted index tree 1400 corresponding to the set of rules and the associated keys defined in the table of FIG. 12. Given tree 1400, assume an entitlements query "what can Craig do on Resource-3?" is received. The request key is [1, 2], which means that walking the tree gets to rule r005 without any candidate responses hit along the way. This means that all potential matches for this attribute source must be returned (including an explicit return of "ALL" as well).

The above are merely representative examples of the weighted index trees and are not meant to be taken to limit the disclosed technique.

As previously described, the above-described techniques may be implemented within a conventional XACML-based processing chain, which preferably includes a suitable request and response protocol to handle queries using a weighted index tree. Although not required, an XACML request-response protocol may include a response that contains xacml:Request objects. This is because the semantics are such that combining the input Request with the returned Response creates a Request that will evaluate to the specified effect (e.g., Permit). Using Request in the response container allows preservation of any Boolean AND semantics that may occur. In addition, in the entitlements embodiment, an application programming interface (API) may be used to call an entitlements engine to process the weighted index tree and, in response, return a set of entitlements. XACML4J (XACML for Java), for example, may be extended to provide the API.

As noted above, a content-based security policy specified by XACML typically includes one or more "combining" algorithms, such as first-applicable, only-one-applicable, deny-overrides, and permit-overrides. Preferably, these combining algorithms are taken into account when combining rules (to make an evaluation decision or to return entitlements). This "rule combining" function is now described.

Because the rules themselves only specify the policy and policy sets that are contained with them (and not the combining algorithms), during policy normalization (as described above) a hierarchy of containing objects and the associated combining algorithms are tracked. Then, to find the correct result to a request or query, it is necessary to honor the combining algorithms at each hierarchy in the index tree. To this end, one approach is to construct a priority queue (or an equivalent) where the "deepest" rules are at the top of the queue. As used herein, "deepest" is calculated by the number of policy sets/policy objects within which each rule is contained. Processing then includes iterating over the priority queue, extracting the "n" topmost elements with the same list of policy set/policy objects. The combining algorithm of the deepest policy set/policy is then used. Once this algorithm is used to determine a result, e.g., "permit," this result is then placed back on the priority queue as the replacement for the original "n" topmost elements. The priority queue is then re-ordered, and a next iteration begins. Eventually, one item is left on the priority queue containing the final evaluation/entitlements decision.

Thus, in a concrete example, assume that the indexed evaluation technique described above has identified that three (3) rules are applicable to an input request. Also, assume that the policy normalization step results in the following data extracted from the tree:
  Rule 1→[PolicySetA, PolicySetB, PolicyC]
  Rule 4→[PolicySetA, PolicySetB, PolicyC]
  Rule 5→[PolicySetA, PolicyD]
  where the combining algorithms are:
  PolicySetA=first-applicable
  PolicySetB=deny-overrides
  PolicyC=first-applicable
  PolicyD=first-applicable As noted above, the priority queue is constructed with the deepest rules are at the top. In this example, Rules 1 and 4 have a depth of 3, and Rule 5 has a depth of 2. Iteration thus begins with Rules 1 and 4. The combining algorithm of the deepest policy set/policy is then used, in this case PolicyC (first-applicable). Once the algorithm is used to determine a result, e.g. Permit, this result is placed back on the priority queue:

Permit→[PolicySetA, PolicySetB]

As noted above, the priority queue is then re-ordered, and the iteration continues until a single item is left on the priority queue.

Generalizing, to honor the combining algorithms, the evaluation result of each rule applicable to the input request should be combined in a way that preserves the original intent of the policy. For example, as the above example illustrates, it is possible to combine decisions using algorithms such as "a deny-overrides other results" or "a permit-overrides other results" (among others). If there are two rules that are applicable and one of them returns Permit and the other Deny, a decision as to which combining algorithm to use is required. To this end, and as noted above, during normalization (i.e. when the policy is flattened into a single set of rules), a first data structure comprising an ordered list of PolicySet and/or Policy identifiers in which the rule was contained are recorded. In a separate second data structure, the combining algorithms used for each PolicySet and Policy also are recorded. Thus, assume FIG. 15 is a representative XACML policy. FIG. 16 is the first data structure for that policy, and FIG. 17 is the second data structure. Preferably, the first table is stored within the flattened rule itself; the second table is stored in a separate data structure. During evaluation, when multiple rules are applicable, the priority queue construct is used to work back up the list of containing policy identifiers, preferably from the bottom of the original policy to the top. For two rules that were once part of the same PolicySet, the original PolicySet's combining algorithm is used to resolve the final result. Preferably, this combining technique starts at the "deepest" rule, working back up and combining the intermediate results.

With respect to the XACML policy shown in FIG. 15, if rule1, rule3 and rule4 are all applicable to a given request, this technique first combines rule3 and rule4, as they are within the same Policy; looking up the algorithm in the policy table, the "first-applicable" combining algorithm is used. Then, the technique combines the result of this combination with the result of evaluating rule1 using the algorithm of the root PolicySet ("deny-overrides") to reach a final decision.

As noted above, in a representative implementation, the technique uses a priority queue, the described data structures, and a comparator function, which moves the "deepest" rules to the top of the queue for evaluation. In this way, the rule combining algorithm only needs to examine the top of the queue at each step of the evaluation.

Without limitation, and as noted above, the policy indexing (including attribute value frequency calculation, sorting and integer assignment), weighted tree generation, and rule combining functions may be implemented in software, as one or more specialized or "particular" machines. The policy evaluation, together with the weighted tree (a data structure), may be implemented in a specialized or "particular" machine, such as an entitlements server. Conventional identity management tools and systems, such as IBM® Tivoli® Security Policy Manager, and Integrated Solutions Console, may be adapted for this purpose, or the techniques may be implemented in any other convenient manner.

The block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

An access control mechanism that implements the disclosed techniques may be implemented as a service, or as a standalone machine.

The techniques of generating and evaluating a weighted index tree may apply to any context-based security policy, and not merely XACML-based techniques. Other examples of context-based security policy include eXtensible rights Markup Language (XrML) and Enterprise Privacy Authorization Language (EPAL).

In the described embodiment, each concrete attribute value is converted to a unique integer so that the tree can be built and indexed using those integer values. While this approach is preferred, it is not required, as there may be other approaches to building the index tree. For example, an alternative implementation may choose to keep the original attribute values and use the original equality functions for each type (such as comparing two strings, or comparing two email addresses).

In addition, the index tree may be built using only a partial set of attribute values in the policy if desired.

Further, the weighted index tree is shown in the drawings for explanatory purposes only; other types of data structures and orientations may be used as well. Thus, the search "tree" may be implemented with other node-based searchable structures, including linked objects, lists, or data arrays.

Other techniques for assigning identifiers to the attribute values may also be used prior to generating the index tree. These include, for example, producing metrics during policy evaluation as to the relative frequency of attribute values in the requests rather than the policy, and periodically re-calculating the tree based on the captured frequency metrics.

The policy evaluation may be implemented with any request-response protocol and with other API mechanisms than the XACML-based versions explained above.

Having described my invention, what I now claim is as follows.

The invention claimed is:

1. A method for evaluating a context-based policy for access control, the policy having a set of attributes, the method comprising:
    identifying a frequency of each of a set of attribute values with respect to one another to define a relative frequency distribution;
    sorting the set of attribute values according to the relative frequency distribution;
    assigning an identifier to each of the sorted attribute values;
    using the identifiers assigned to the sorted attribute values, generating a search tree weighted according to the identifiers assigned to the sorted attribute values, each leaf of the search tree defining a rule, and wherein a depth-first path down the leaf represents one or more attributes of the set of attributes that must be present in a request for the rule to be applicable;
    evaluating a request against the search tree weighted according to the identifiers assigned to the sorted attribute values to generate a response; and
    having an access control mechanism that uses the response to perform an access control operation;
    at least one of the identifying, generating, evaluating and using steps being carried out in software executing on a hardware element.

2. The method as described in claim 1 wherein the request is an authorization request and the response is a permit or deny authorization decision.

3. The method as described in claim 2 wherein the step of evaluating the authorization request comprises:
    converting the authorization request into a set of identifiers; and
    performing a depth-first search of the search tree using the set of identifiers associated with the authorization request, wherein:
        during the depth-first search, a child node in the search tree is only evaluated if the child node is present in a context associated with the authorization request as determined by one or more identifiers in the set of identifiers; and
        once a leaf in the tree is reached, evaluating the rule associated therewith.

4. The method as described in claim 1 wherein the request is an entitlements query and the response is a set of entitlements.

5. The method as described in claim 4 wherein the step of evaluating the entitlements query comprises:
    converting the entitlements query into a set of identifiers comprising a request context and one or more attribute types that are to be gathered in response to the entitlements query;
    performing a depth-first search of the search tree using the set of identifiers associated with the entitlements query, wherein:
        during the depth-first search, a child node in the search tree is only evaluated if the child node is present in the authorization request as determined by one or more identifiers in the set of identifiers or if the child node is of an attribute type being gathered;
        once the leaf in the tree is reached, evaluating the rule associated therewith.

6. The method as described in claim 1 wherein the identifiers are numerical identifiers.

7. The method as described in claim 1 wherein the context-policy is specified in a markup language.

8. The method as described in claim 7 wherein the markup language is XACML.

9. The method as described in claim 8 wherein the evaluating step includes honoring XACML combining algorithms.

10. An apparatus, comprising:
    a processor; and
    computer memory holding computer instructions executed by the processor to perform operations to evaluate a context-based policy for access control, the policy having a set of attributes, the operations comprising:
        identifying a frequency of each of a set of attribute values with respect to one another to define a relative frequency distribution;
        sorting the set of attribute values according to the relative frequency distribution;
        assigning an identifier to each of the sorted attribute values;
        using the identifiers assigned to the sorted attribute values, generating a search tree weighted according to the identifiers assigned to the sorted attribute values, each leaf of the search tree defining a rule, and wherein a depth-first path down the leaf represents one or more attributes of the set of attributes that must be present in a request for the rule to be applicable;
        evaluating a request against the search tree weighted according to the identifiers assigned to the sorted attribute values to generate a response; and
    an access control mechanism that uses the response to perform an access control operation.

11. The apparatus as described in claim 10 wherein the request is an authorization request and the response is a permit or deny authorization decision.

12. The apparatus as described in claim 11 wherein the step of evaluating the authorization request comprises:

converting the authorization request into a set of identifiers; and performing a depth-first search of the search tree using the set of identifiers associated with the authorization request, wherein:

during the depth-first search, a child node in the search tree is only evaluated if the child node is present in a context associated with the authorization request as determined by one or more identifiers in the set of identifiers; and once a leaf in the tree is reached, evaluating the rule associated therewith.

13. The apparatus as described in claim 10 wherein the request is an entitlements query and the response is a set of entitlements.

14. The apparatus as described in claim 13 wherein the step of evaluating the entitlements query comprises:

converting the entitlements query into a set of identifiers;

performing a depth-first search of the search tree using the set of identifiers associated with the entitlements query, wherein:

during the depth-first search, a child node in the search tree is only evaluated if the child node is present in the authorization request as determined by one or more identifiers in the set of identifiers or if the child node is of an attribute type being gathered;

once the leaf in the tree is reached, evaluating the rule associated therewith.

15. The apparatus as described in claim 10 wherein the identifiers are numerical identifiers.

16. The apparatus as described in claim 10 wherein the context-policy is specified in a markup language.

17. The apparatus as described in claim 16 wherein the markup language is XACML.

18. The apparatus as described in claim 17 wherein the evaluating operation includes honoring XACML combining algorithms.

19. A computer program product in a non-transitory computer readable medium for use in a data processing system, the computer program product holding computer program instructions which, when executed by the data processing system, perform operations to evaluate a context-based policy for access control, the policy having a set of attributes, the operations comprising:

identifying a frequency of each of a set of attribute values with respect to one another to define a relative frequency distribution;

sorting the set of attribute values according to the relative frequency distribution;

assigning an identifier to each of the sorted attribute values;

using the identifiers assigned to the sorted attribute values, generating a search tree weighted according to the identifiers assigned to the sorted attribute values, each leaf of the search tree defining a rule, and wherein a depth-first path down the leaf represents one or more attributes of the set of attributes that must be present in a request for the rule to be applicable;

evaluating a request against the search tree weighted according to the identifiers assigned to the sorted attribute values to generate a response; and providing an access control mechanism that uses the response to perform an access control operation.

20. The computer program product as described in claim 19 wherein the request is an authorization request and the response is a permit or deny authorization decision.

21. The computer program product as described in claim 20 wherein evaluating the authorization request comprises:

converting the authorization request into a set of identifiers; and performing a depth-first search of the search tree using the set of identifiers associated with the authorization request, wherein:

during the depth-first search, a child node in the search tree is only evaluated if the child node is present in a context associated with the authorization request as determined by one or more identifiers in the set of identifiers; and once a leaf in the tree is reached, evaluating the rule associated therewith.

22. The computer program product as described in claim 19 wherein the request is an entitlements query and the response is a set of entitlements.

23. The computer program product as described in claim 22 wherein evaluating the entitlements query comprises:

converting the entitlements query into a set of identifiers comprising a request context and one or more attribute types that are to be gathered in response to the entitlements query;

performing a depth-first search of the search tree using the set of identifiers associated with the entitlements query, wherein:

during the depth-first search, a child node in the search tree is only evaluated if the child node is present in the authorization request as determined by one or more identifiers in the set of identifiers or if the child node is of an attribute type being gathered;

once the leaf in the tree is reached, evaluating the rule associated therewith.

24. The computer program product as described in claim 19 wherein the identifiers are numerical identifiers.

25. The computer program product as described in claim 19 wherein the context-policy is specified in a markup language.

26. The computer program product as described in claim 25 wherein the markup language is XACML.

27. The computer program product as described in claim 26 wherein the evaluating operation includes honoring XACML combining algorithms.

* * * * *